(12) United States Patent
Kienan

(10) Patent No.: US 6,598,042 B1
(45) Date of Patent: Jul. 22, 2003

(54) SYSTEM AND METHOD FOR QUERY BY CATEGORY

(75) Inventor: Gerald George Kienan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 09/677,084

(22) Filed: Sep. 29, 2000

(51) Int. Cl.⁷ .............................................. G06F 17/30
(52) U.S. Cl. ......................................................... 707/3
(58) Field of Search ........................... 707/3–4, 10, 100

(56) References Cited

U.S. PATENT DOCUMENTS

| | | | | |
|---|---|---|---|---|
| 5,428,776 A | * | 6/1995 | Rothfield | 707/4 |
| 5,911,138 A | * | 6/1999 | Li et al. | 707/3 |
| 6,188,403 B1 | * | 2/2001 | Sacerdoti et al. | 345/764 |
| 6,208,985 B1 | * | 3/2001 | Krehel | 707/3 |
| 6,243,703 B1 | * | 6/2001 | Couch et al. | 707/10 |

OTHER PUBLICATIONS

Ramon Lawrence and Ken Barker, Multidatabase Querying by Context.*

Ramon Lawrence and Ken Barker, Querying Relational Databseses Without Explicit Joins.*

Publication: "PESTO: An Integrated Query/Browser for Object Databases". Carey et al. Proceedings of the 22nd VLDB Conference. pp. 203–214. Mumbia(Bombay), India 1996.

BOOK: "Query–By–Example". M. M. Zloof. IBM System J. No. 4, pp. 324–343. 1977.

* cited by examiner

*Primary Examiner*—Safet Metjahic
*Assistant Examiner*—Haythim J. Alaubaidi
(74) *Attorney, Agent, or Firm*—John L. Rogitz

(57) ABSTRACT

A system and method for automatically generating an SQL query without requiring a user to know SQL. A category hierarchy representing a relational database system is presented to the user, and the user can navigate through the hierarchy, combine categories, and restructure the hierarchy to identify a category of interest to the user. The user then selects the category and indicates that a query should be generated based thereon. Query predicates are first generated, based on the type of category selected, and then a "from" query clause and "select" query clause are generated.

34 Claims, 15 Drawing Sheets

CATEGORY MERGING FOR SINGLE VALUED CATEGORIES

ARCHITECTURE

| EM... | FIRST... | MIDINIT | LASTN... | WORK... | PHON... | HIRED... | JOB | EDLE... | SEX | BIRTH... | SALARY | BONUS | COMM |
|---|---|---|---|---|---|---|---|---|---|---|---|---|---|
| 00... | SHILL... | I | HAAS... | A00 | 3978 | 1947- | PRES | 18 | F | 1926- | 52760 | 1000.00 | 4220... |
| 00... | MICHA... | L | THOM... | B01 | 3476 | 1947- | MANA... | 18 | M | 1926- | 41250 | 800.00 | 3300... |
| 00... | SALLY... | A | KWAN... | C01 | 4738 | 1947- | MANA... | 20 | F | 1926- | 42170 | 800.00 | 3060... |
| 00... | JOHN... | B | GEYE... | E01 | 6789 | 1947- | MANA... | 16 | N | 1926- | 40175 | 800.00 | 3214... |
| 00... | IRVIN... | F | STER... | D11 | 6423 | 1947- | MANA... | 16 | N | 1926- | 32250 | 500.00 | 2580... |
| 00... | EVA | D | PULA... | D21 | 7831 | 1947- | MANA... | 16 | F | 1926- | 36170 | 700.00 | 2893... |
| 00... | EILEE... | W | HEND... | E11 | 5498 | 1047- | MANA... | 16 | F | 1926- | 29750 | 600.00 | 2380... |
| 00... | THEO... | Q | SPEN... | A00 | 0972 | 1947- | MANA... | 16 | M | 1926- | 26150 | 500.00 | 2092... |
| 00... | VINCE... | G | LUCC... | A00 | 3490 | 1947- | SALE... | 14 | M | 1926- | 46500 | 900.00 | 3720... |
| 00... | SEAN... |   | OCO... | C01 | 2167 | 1947- | CLER... | 19 | M | 1926- | 29250 | 600.00 | 2340... |
| 00... | DOLO... | M | QUINT... | C01 | 4578 | 1947- | ANALY... | 14 | F | 1926- | 26239 | 500.00 | 1904... |
| 00... | HEAT... | A | NICH... | D11 | 1793 | 1947- | ANALY... | 16 | F | 1926- | 31333 | 600.00 | 2274... |
| 00... | BRUC... |   | ADAM... | D11 | 4510 | 1947- | DESIG... | 18 | F | 1926- | 25280 | 500.00 | 2022... |
| 00... | ELIZA... | R | PIANK... | D11 | 3782 | 1947- | DESIG... | 16 | M | 1926- | 22250 | 400.00 | 1780... |
| 00... | MASA... | J | YOSHI... | D11 | 2890 | 1947- | DESIG... | 17 | F | 1926- | 24680 | 500.00 | 1974... |
| 00... | MARIL... | S | SCOU... | D11 | 1682 | 1947- | DESIG... | 16 | M | 1926- | 21340 | 500.00 | 1707... |
| 00... | JAME... | H | WALK... | D11 | 2986 | 1947- | DESIG... | 17 | F | 1926- | 20450 | 400.00 | 1636... |
| 00... | DAVID... |   | BROW... | D11 | 4501 | 1947- | DESIG... | 16 | M | 1926- | 27740 | 600.00 | 2217... |
| 00... | WILLI... | T | JONE... | D11 | 0942 | 1947- | DESIG... | 16 | M | 1926- | 18270 | 400.00 | 1462... |
| 00... | JENNI... | K | LUTZ... | D11 | 0672 | 1947- | DESIG... | 18 | F | 1926- | 29840 | 600.00 | 2387... |
| 00... | JAME... | J | JEFFE... | D21 | 2094 | 1947- | CLER... | 14 | M | 1926- | 22180 | 400.00 | 1774... |
| 00... | SALVA... | M | MARIN... | D21 | 3780 | 1947- | CLER... | 17 | M | 1926- | 28760 | 600.00 | 2301... |
| 00... | DAVIE... | S | SMITH | D21 | 0861 | 1947- | CLER... | 16 | M | 1926- | 18180 | 400.00 | 1534... |

FIG. 2 - INITIAL QBC DISPLAY

FIG. 3- HIERARCHY WINDOW EXPANSION

FIG. 4 - HIERARCHY RESTRUCTURING

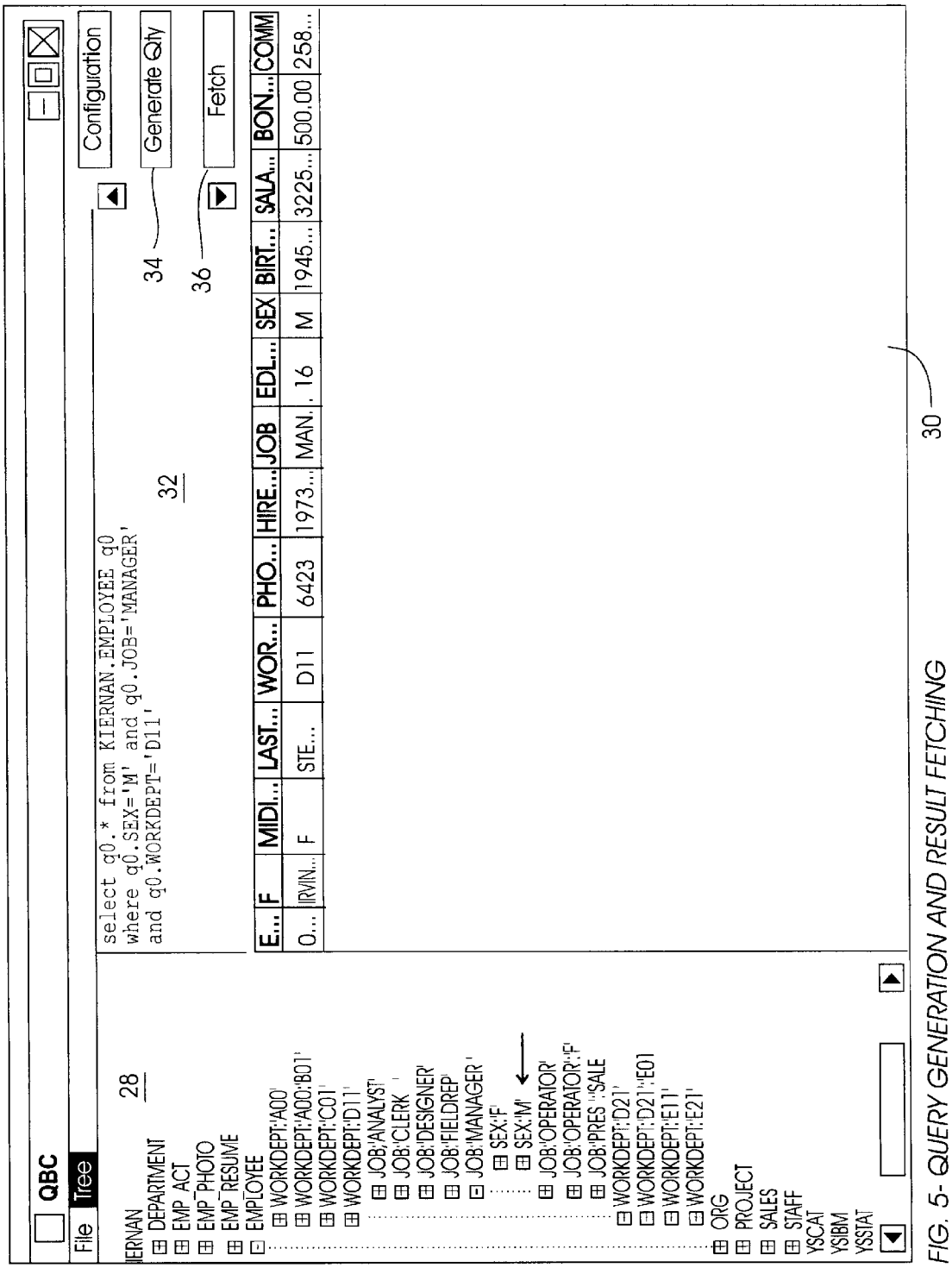
FIG. 5- QUERY GENERATION AND RESULT FETCHING

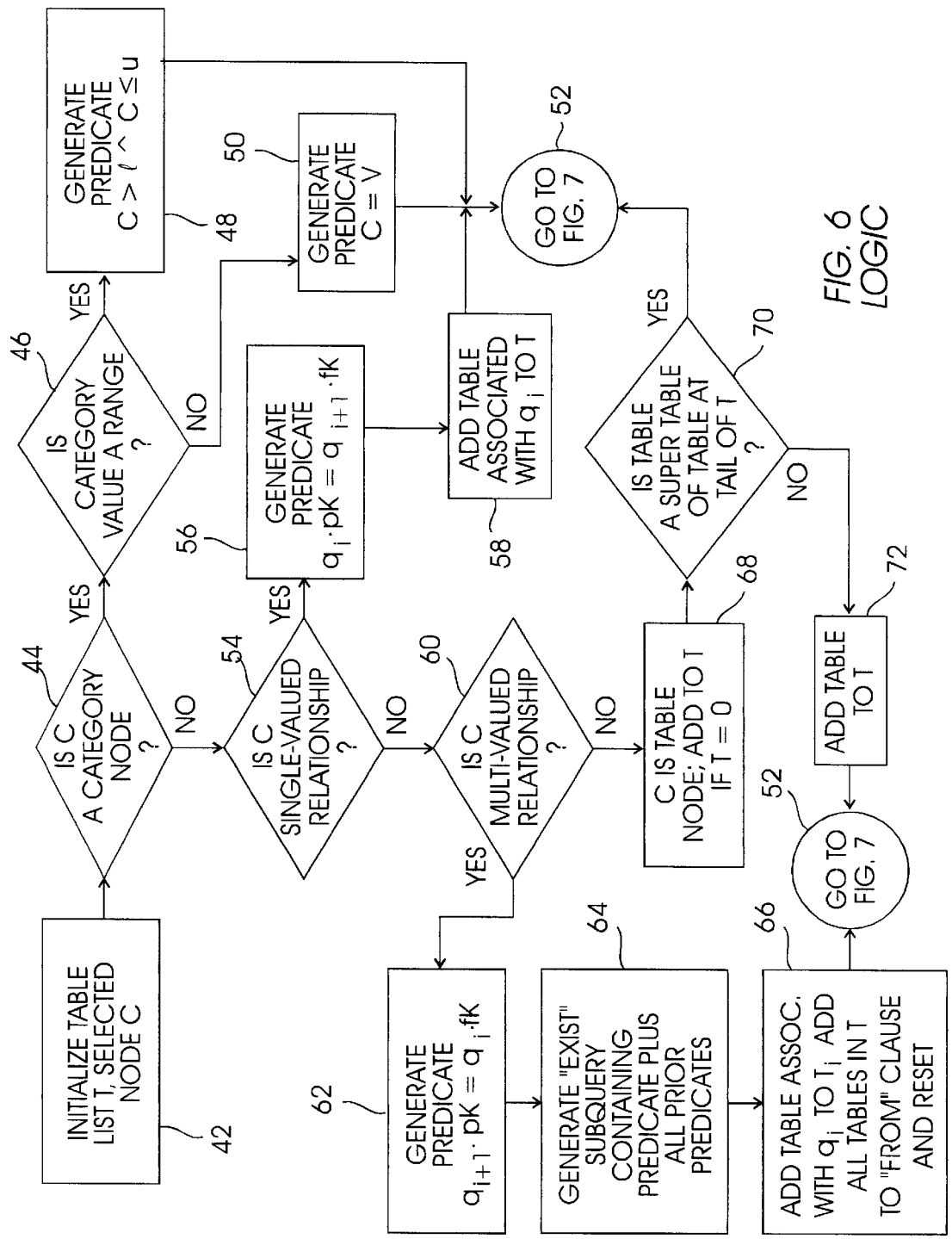
FIG. 6 LOGIC

LOGIC (CONTINUED)

FIG. 8 - CATEGORY MERGING FOR SINGLE VALUED CATEGORIES

| | QBC | | | | | | | | | | | | | | | □ ⊡ ⊠ |
|---|---|---|---|---|---|---|---|---|---|---|---|---|---|---|---|---|
| File | Tree | | | | | | | | | | | | | | | Configuration |
| □ root | | | | | | | | | | | | | | | | ◀ |
| | ⊟ KIERNAN | | | | | | | | | | | | | | | |
| | ⊞ DEPARTMENT | | select q0.* from KIERNAN.EMPLOYEE q0, | | | | | | | | | | | | | Generate Qly |
| | ⊞ EMP_ACT | | ((q0.EMPNO > '000100' and q0.EMPNO < | | | | | | | | | | | | | |
| | ⊞ EMP_PHOTO | | OR (q0.EMPNO > .000010' amd q0.EMPNO | | | | | | | | | | | | | |
| | ⊞ EMP_RESUME | | | | | | | | | | | | 32 | | | |
| | ⊟ EMPLOYEE | | | | | | | | | | | | | | | ▶ Fetch |
| | ⊞ EMPNO:'000010' | | | | | | | | | | | | | | | |
| | ⊞ EMPNO:'000030':'000060' | | EMPNO | FI... | MI... | LA... | W... | P... | HI... | JOB | E... | SEX | BI... | SA... | B... | C... |
| | ⊞ EMPNO:'000060':'000090' | | 000020 | MI... | L | T... | B01 | 34... | 19... | M... | 18 | M | 19... | 41... | 80... | 33... |
| | ⊞ EMPNO:'000090':'000100' | | 000030 | SA... | A | K... | C01 | 47... | 19... | M... | 20 | F | 19... | 42... | 80... | 30... |
| | ⊞ EMPNO:'000100':'000120':'000010':'000030' | | 000110 | VI... | G | L... | A00 | 34... | 19... | SA... | 19 | M | 19... | 46... | 90... | 37... |
| | ⊞ EMPNO:'000120':'000140' | | 000120 | S... | | 0'... | A00 | 21... | 19... | C... | 19 | M | 19... | 29... | 60... | 23... |
| | ⊞ EMPNO:'000140':'000150' | | | | | | | | | | | | | | | |
| | ⊞ EMPNO:'000150':'000170' | | | | | | | | | | | | | | | |
| | ⊞ EMPNO:'000170':'000190' | | | | | | | | | | | | | | | |
| | ⊞ EMPNO:'000190':'000210' | | | | | | | | | | | | | | | |
| | ⊞ EMPNO:'000210':'000220' | | | | | | | | | | | | | | | |
| | ⊞ EMPNO:'000220':'000240' | | | | | | | | | | | | | | | |
| | ⊞ EMPNO:'000240':'000260' | | | | | | | | | | | | | | | |
| | ⊞ EMPNO:'000260':'000270' | | | | | | | | | | | | | | | |
| | ⊞ EMPNO:'000270':'000290' | | | | | | | | | | | | | | | |
| | ⊞ EMPNO:'000290':'000310' | | | | | | | | | | | | | | | |
| | ⊞ EMPNO:'000310':'000320' | | | | | | | | | | | | | | | |
| | ⊞ EMPNO:'000320':'000340' | | | | | | | | | | | | | | | |
| | ⊞ ORG | | | | | | | | | | | | | | | |
| | ⊞ PROJECT | | | | | | | | | | | | | | | |
| | ⊞ SALES | | 28 | | | | | | | | | | | | | |
| | ⊞ STAFF | | | | | | | | | | | | | | | |
| | ⊞ SYSCAT | | | | | | | | | | | | | | | |
| | ⊞ SYSIBM | | | | | | | | | | | | | | | |
| | ⊞ SYSSTAT | | | | | | | | | | | | | | | |

FIG. 9 - CATEGORY MERGING FOR RANGE VALUED CATEGORIES

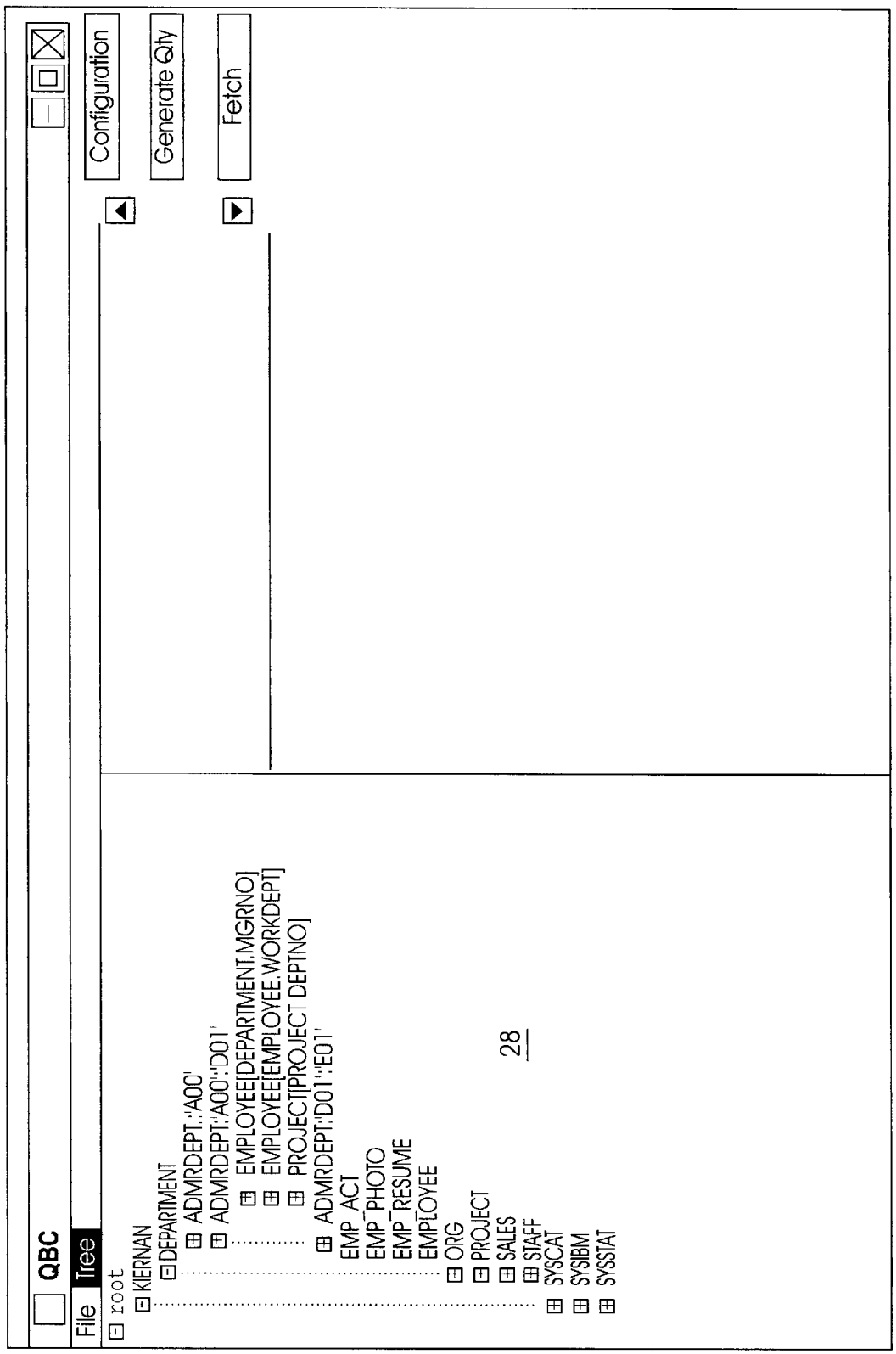
FIG. 10 - CATEGORIZATION OF RELATIONSHIPS

```
QBC                                                            – ☐ ⊠
File  Tree                                                Configuration
☐ root             select q1.* from KIERNAN.EMPLOYEE
⊟ KIERNAN          KIERNAN.DEPARTMENT q1 where q0.SEX='F' and
  ⊞ DEPARTMENT     q0.EMPNO=q1.MGRNO and                  Generate Qry
    ⊞ ADMRDEPT:'A00'     (q1.ADMRDEPT > 'A00' and q1.ADMRDEPT <= 'D01')
    ⊞ ADMRDEPT:'A00':'D01'
    ⊟ EMPLOYEE(DEPARTMEN                           ◀
       ⊟ SEX:'F'
       ⊞  SEX:'M'                                                32
       ⊞                                           ▶       Fetch
       ⊞
       ⊞ ADMRDEPT:'D01':'E01' | DEPTNO. | DEPTNAME        | MGRNO  | ADMRDEPT | LOCATION |
  ⊞ EMP_ACT                   | D21     | ADMINISTRATIO...| 000070 | D01      |          |
  ⊞ EMP_PHOTO
  ⊞ EMP_RESUME
  ⊞ EMPLOYEE
  ⊞ ORG
  ⊞ PROJECT
  ⊞ SALES
  ⊞ STAFF
  ⊞ SYSCAT
  ⊞ SYSIBM                              28
  ⊞ SYSSTAT
▼                                           ▲
```

*FIG. 11 - SINGLE-VALUED RELATIONSHIPS*

FIG. 12 - MULTI-VALUED RELATIONSHIPS

FIG. 13 - SUBTABLES IN TYPED TABLE HIERARCHIES

| QBC | | □ ☒ |
|---|---|---|
| File Tree | | |

| | | Configuration |
|---|---|---|
| INTEGER | | |
| SMALLINT | | |
| VARCHAR | | Generate Qty |
| VARCHAR_FBD | | |

```
select q1.* from NEWTON.EMP q0, NEWTON q1
where (q0.SALARY > 500000 and q0.SALARY <=1000000
and q0.OID=q1.MGR and q1.SALARY=135000 and
(q1.BIRTHYR > 1955 and q1.BIRTHYR <= 1965)
```

28                                                                32   ▶ Fetch

| OID | NAME | BIRTHYR | PET | SALARY | DEPT | MGR |
|---|---|---|---|---|---|---|
| B@1f81bf | Jerry | 1965 | | 135000 | B@1f815c | B@1f815d |

N
THYR:1947
THYR:1947:1953
THYR:1955
THYR:1955:1965
EMP
  ⊞ SALARY:110000
  ⊞ SALARY:110000:125001
  ⊟ SALARY:135000
    ⊞ SALARY:135000:500000
    ⊞ SALARY:500000:1000000
    ⊞ SALARY:1000000:2500000
    ⊞ SALARY:5000000
    ⊞ MGR
    ⊟ EXEC
    ⊟ EMP[EMP:MGR]
      ⊞ DEPT[EMP:DEPT]
      ⊞ EXEC[EXEC.MGR]
      ⊞ MGR[MGR.MGR]
      ⊟ EMP[EMP.MGR]
        ⊞ SALARY:135000:500000
        ⊞ SALARY:500000:1000000

*FIG. 14 - SINGLE-VALUED REFERENCE*

```
QBC                                                    _ □ ⊠
File  Tree
K55ADMIN                           28    ◄  Configuration
NEWTON
 ⊞ DEPT_BIGINT_HIERARCHY               select q1.* from NEWTON.DEPT q1 where
 ⊞ DEPT_CHAR_FBD_HIERARCHY             (select 1 from NEWTON.EMP q0 where
 ⊞ DEPT_CHAR_HIERARCHY                 (q0.BIRTHYR > 1955 and q0.BIRTHYR <=1965 and
 ⊞ DEPT_DECIMAL102_HIERARCHY           q0.DEPT=q1.OID) and q1.NAME='Component Broker'
 ⊞ DEPT_DECIMAL80_HIERARCHY
 ⊞ DEPT_HIERARCHY_                                     ►   Generate Qry
 ⊞ DEPT_SMALLINT_HIERARCHY                  32
 ⊞ DEPT_INTEGER_HIERARCHY
 ⊞ DEPT_VARCHAR_FBD_HIERARC                              Fetch
 ⊞ DEPT_VARCHAR_HIERARCHY
 ⊞ PERSON_HIERARCHY                | OID     | NAME           | HEADCOUNT | BUDGET  | BACKUP |
 ⊟ DEPT                            |---------|----------------|-----------|---------|--------|
    ⊟ NAME:'Component Broker'      | B@1688f | Component Brok.| 150       | 5000000 |        |
      ⊞ EXEC(EXECDEPT)
      ⊞ MGR(MGRDEPT)
      ⊟ EMP(EMPDEPT)
         ⊞ BIRTHYR:1947
         ⊞ BIRTHYR:1947:1953
         ⊞ BIRTHYR:1955
         ⊞ BIRTHYR:1955:1965
         ⊞ BIRTHYR:1967
         ⊞ BIRTHYR:1967:1968
         ⊞ BIRTHYR:1974
    ⊞ NAME:'Component Broker':'DB
    ⊞ NAME:'DB Development':'Marke
    ⊞ NAME:'Marketing'
 ⊞ DEPT_BIGINT
 ⊞ DEPT_CHAR
 ⊞ DEPT_CHAR_FBD
```

*FIG. 15 - MULTI-VALUED REFERENCES*

SYSTEM AND METHOD FOR QUERY BY CATEGORY

BACKGROUND OF THE INVENTION

1. Field of the Invention

The present invention relates to systems and methods for data querying.

2. Description of the Related Art

Relational database management systems (RDBMS) have become the repository of choice for data, owing to the ease with which data can be extracted in response to a particular user-generated query. The query language typically used in extracting data from RDBMS is SQL, the properties of which advantageously simplify the data retrieval. Unfortunately, SQL is a language that remains beyond the expertise of most users.

A query paradigm referred to as query by example, or QBE, has been developed to address the above-noted problem, wherein a user can indicate an example of a desired query result and an SQL query is then generated based on the user's indication. Unfortunately, QBE still requires that the user understand the formulation of some query predicates, and further QBE does not provide any indication of the values stored in the database tables. Moreover, when more than one table is required to respond to a query, QBE imposes additional complexity on the user, requiring the user to understand certain join principles of SQL. In light of the above-noted problems, the present invention critically observes that it is desirable to provide a way for user to query a database, including queries against more than a single table, without knowing anything about SQL.

Another query tool has been introduced by Microsoft Corp. under the trade name "Access". In "Access", a graphical representation of a query is presented. However, the graphical representation is bound to the structure of queries, not to the categorization of data, which the present invention understands to be a completely different and far more intuitive way to facilitate database querying. Accordingly, the present invention, having understood the need for a query tool that does not require any knowledge of SQL and that is easy and intuitive to use, presents the solutions set forth herein.

SUMMARY OF THE INVENTION

A general purpose computer is programmed according to the inventive steps herein to undertake the query by category logic of the present invention. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

Accordingly, a general purpose computer includes logic for querying a database for data. The logic includes presenting, to a user, a category hierarchy representative of data in a relational database system. The logic also includes permitting a user to make a selection of an entry in the category hierarchy. Using the selection, a query is automatically generated.

In a preferred embodiment, the logic includes initializing a node "C" based on the selection, and then associating the node "C" with a type of node. A predicate based on the type of node is then generated.

In more detail, the logic determines whether the node "C" is a category node. If it is, the logic determines whether a value of the node is a range of values, and if so, the logic generates a query predicate based on an upper bound of the range and a lower bound of the range. Otherwise, the logic generates a query predicate based on a single value. If, on the other hand, "C" is a single-valued relationship, a query predicate is generated based on a table having the primary key and a table having the foreign key, and the table associated with the primary key is added to a list of tables. Still further, when "C" is a multi-valued relationship, a query predicate is generated based on a table having the primary key and a table having the foreign key, and an exist subquery containing the predicate and all previously generated predicates is generated, with the table associated with the foreign table key being added to the list of tables. Or, "C" might represent a table node, in which case the logic conditionally adds the node to a list "T" of tables.

Once the query predicates have been generated, "C" is reset to be its own parent node, and unless the reset "C" is one level below the hierarchy root, the logic iteratively generates a predicate based on the type of node as discussed above. At the conclusion of iterations, if any, a "from" query clause is generated by iterating through the list "T" of tables, and then a "select" clause is generated.

If desired, a user can be permitted to combine at least two categories in the hierarchy. Also, the logic can include permitting a user to restructure the hierarchy.

In another aspect, a computer-implemented method for querying a database includes selecting a category from a hierarchy representing a relational database, and generating a query using the category.

In still another aspect, a computer program device includes a computer program storage device that can be read by a digital processing apparatus. A program is on the program storage device, and the program includes instructions that are executable by the digital processing apparatus for performing method acts for generating a query based on a user selection of a database category in a hierarchy. The program includes computer readable code means for generating at least one SQL query predicate based on a user-selected category of data in a database.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is an initial screen display;

FIG. 3 is a screen display illustrating hierarchy window expansion;

FIG. 4 is a screen display illustrating hierarchy restructuring;

FIG. 5 is a screen display illustrating query generation;

FIG. 6 is a flow chart showing the first portion of the query generation logic;

FIGS. 8–15 are screen displays illustrating various user interactions and features supported by QBC.

DETAILED DESCRIPTION OF THE PREFERRED EMBODIMENTS

Figure 1:
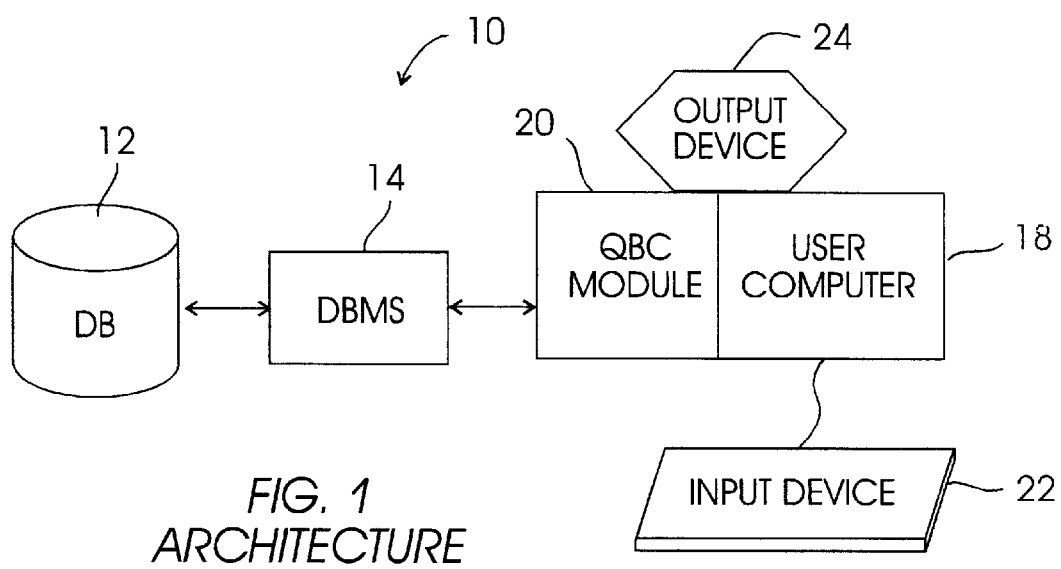
FIG. 1 is a schematic diagram showing the system of the present invention.

Referring initially to FIG. 1, a system is shown, generally designated 10, for querying a relational database system by selecting categories of data. The database system includes a database 12 and a database management system (DBMS) 14. In one non-limiting embodiment, the database system can be a DB2 version 6.1 system made by the present assignee, it being understood that the principles advanced herein apply to other database systems as well.

A user can use a computer 18 to execute a query by category (QBC) 20 to effect the inventive logic herein. The database 12 may reside, for example, in a Web server or other location remote from the user computer 18 and be accessible via a wide area network, such as but not limited to the Internet.

In one intended embodiment, the computer 18 may be a personal computer made by International Business Machines Corporation (IBM) of Armonk, N.Y., or the computer 18 may be any computer, including computers sold under trademarks such as AS400, with accompanying IBM Network Stations. Or, the computer 18 may be a Unix computer, or OS/2 server, or Windows NT server, or IBM RS/6000 250 workstation or an IBM laptop computer.

As shown in FIG. 1, the computer 18 is electrically connected to one or more input devices 22, e.g., a mouse or keyboard, which can be manipulated by a user of the system 10 to undertake the logic below. The results of the application execution can be output via an output device 24 such as a printer or monitor that are conventionally coupled to the computer 18.

With the above overview of the present architecture in mind, it is to be understood that the present logic is executed on the architecture shown in FIG. 1 in accordance with the flow charts discussed below. The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the logic may be embodied by a computer program that is executed by a processor within the computer 18 as a series of computer-executable instructions. These instructions may reside, for example, in RAM of the computer 18 or on a hard drive or optical drive of the computer 18, or the instructions may be stored on a DASD array, magnetic tape, electronic read-only memory, or other appropriate data storage device. In an illustrative embodiment of the invention, the computer-executable instructions may be lines of compiled $C^{++}$ compatible code.

Now referring to FIG. 2, an exemplary initial screen display 26 can be seen. As shown, the initial display 26 includes a left vertical category hierarchy window 28 which shows the selected category hierarchy. In the initial display, the window 28 simply indicates "root". A large bottom right query result window 30 shows the results of a query against the hierarchy, which corresponds to the database state for the query in a query text window 32. The query in the text window 32 preferably is an SQL query that can be manually input by a user or more preferably that is automatically generated based on operations in the category hierarchy window 28 as discussed further below. A generate query button 34 and fetch button 36, along with a configuration button 38, can also be provided for purposes to be shortly disclosed.

Figure 3:
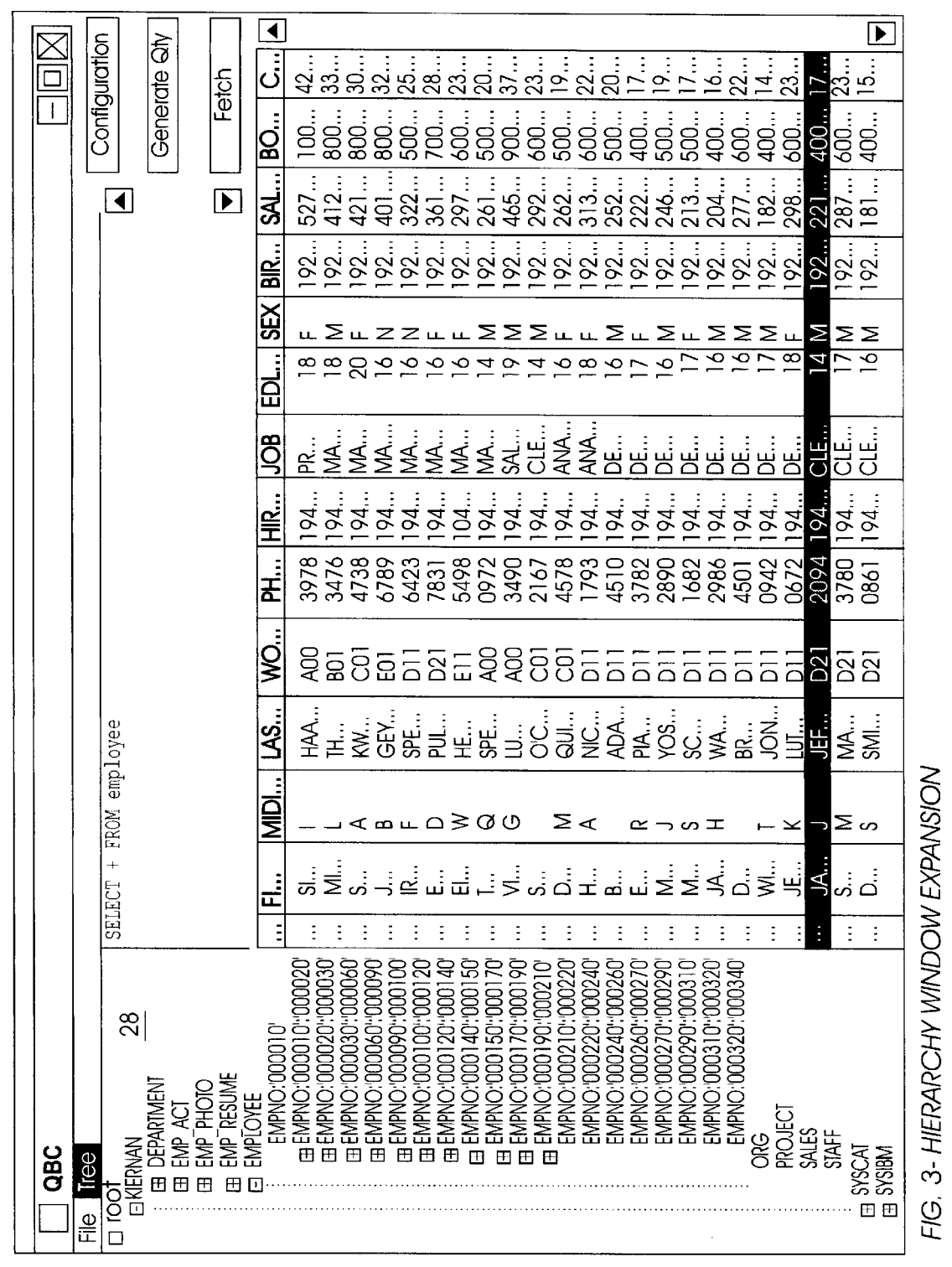

FIG. 3 shows that the hierarchy in the category hierarchy window 28 has been expanded. It is to be understood that the first two levels below the root do not represent categories, but rather available database schemas. In the example shown, the first schema is "Kiernan". Below the schema level are the individual tables contained in that schema, e.g., "employee". In turn, below the table level are the categories derived from the data, with the first category in the example shown being based on employee number ("empno"). Because this attribute is a key and consequently has a large number of values, the categories established around this attribute are based on ranges of values as shown in FIG. 3. For purposes of the present invention, the ranges are of the form $l<x\leq u$, where "l" is the lower bound for the range, "u" is the upper bound, and "x" is a value in the range.

Figure 4:
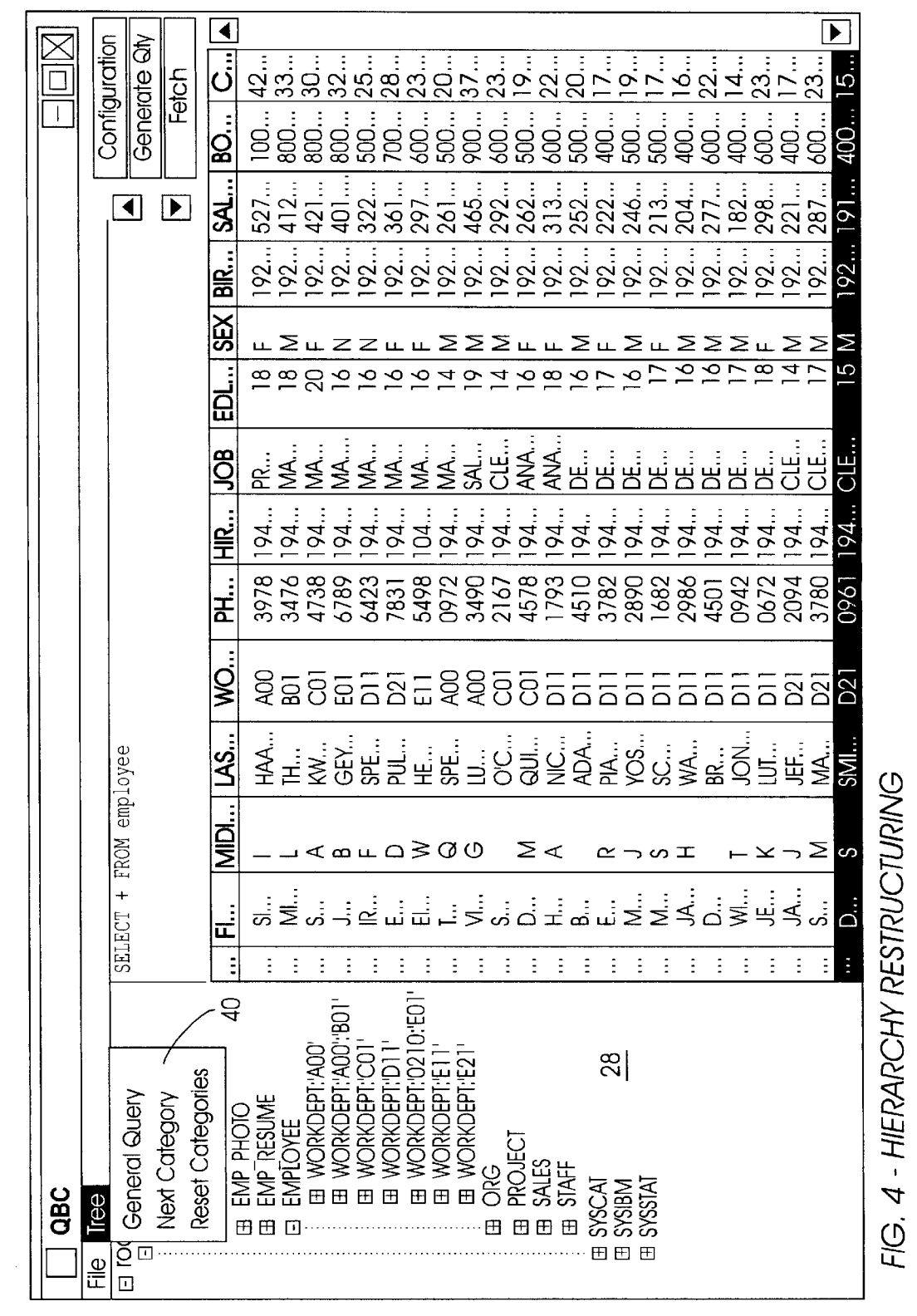

If desired, a drop-down menu 40 can be provided as shown in FIG. 4, one of the entries of which is a "next category" selection. By clicking on "next category", the displayed level is replaced with the next level of categorization. Several levels can be skipped in this manner. In any case, after selection the next level is presented in the category hierarchy window 28. In the exemplar shown in FIG. 4, the level presented is "work department", which contains both single-valued categorization as well as ranges as shown. The original state of the hierarchy can be established by selecting "reset categories" in the drop-down menu 40. In this way, hierarchy restructuring can be undertaken by the user to browse categories.

FIG. 5 shows a screen display of generating a query. An SQL query is shown in the query text window 32 that has been automatically generated in accordance with logic discussed below by the user selecting the generate query button 34 after having established the hierarchy shown in the category hierarchy window 28. Because the example shown has expanded "work department D11" and "job manager" sub-category and has selected "male sex" as a sub-category of job manager, the query shown in the query text window 32 will select all attributes from the employee table where the sex is indicated as male, the job title is indicated as being manager, and the department is D11. The fetch button 36 is then clicked to execute the query in the query text window 32 against the database and display the results of the query in the query result window 30. Thus, by selecting any node in the hierarchy and clicking on the generate query button 34, an SQL query is automatically generated and displayed in the query text window 32 in response.

FIG. 6 shows the logic for generating a query predicate when the generate query button is selected. Commencing at block 42, a table list "T" is initialized to zero and a node "C" is initialized to the user-selected hierarchy node. Proceeding to decision diamond 44, it is determined whether the node "C" is a category node. If it is, the logic flows to decision diamond 46 to determine whether the category is a single value or a range of values. When a range of values is indicated, the process moves to block 48 to generate a predicate of the form $c>l \wedge c \leq u$, where, as discussed above, "l" and "u" are the lower and higher bounds of the range and where "c" is a database table column name. On the other hand, when a single value is indicated, the logic moves from decision diamond 46 to block 50 to generate a predicate of the form $c=v$, where "v" is the single value. From blocks 48 and 50, the logic proceeds state 52 to move to block 74 in FIG. 7.

If the selected category is not a category node, the logic moves from decision diamond 44 to decision diamond 54, wherein it is determined whether the selected category is a single-valued relationship. If it is, the logic proceeds to block 56 to generate a predicate of the form $q_i \cdot pk = q_{i+1} \cdot fk$, wherein (for single valued relationships) $q_i \cdot pk$ is the current table having the primary key pk, and $q_{i+1} \cdot fk$ is the next table in the list as the process moves up the hierarchy toward the root, with the next table $q_{i+1} \cdot fk$ having a foreign key fk that is matched against the primary key.

For example, in dept.dno=emp.dno, dno is the primary key of table "dept" and the foreign key of table "emp". As the process moves up the hierarchy, the "dept" table is reached before the "emp" table, i.e., starting from the "emp" table, the relationship from an employee to a department is single-valued. Conversely, if a relationship were multi-valued, the foreign key column would be associated with the table $q_i$ and the primary key with the table $q_{i+1}$, which would be the case, for example, if the "dept" table were being reached from the "emp" table moving through the hierarchy toward the root: the relationship modelling the set of employees in a department.

At block 58 the table associated with $q_i$ is added to the tail of the table list "T". The logic then enters, at state 52, block 74 in FIG. 7.

In contrast, when the selected category is neither a category node nor a single-valued relationship, the logic proceeds to decision diamond 60 to determine whether the category is a multi-valued relationship. If it is, the process flows to block 62 to generate, as discussed above, a predicate of the form $q_{i-} \cdot pk = q_i \cdot fk$, wherein $q_{i+1} \cdot pk$ is a primary key and $q_i \cdot fk$ is a foreign key. Next, at block 64 an "exist" subquery is generated that contains the newly defined predicate and all of the previously defined predicates. Then, at block 66 the table associated with $q_i$ is added to the tail of the table list "T". Also, all of the tables in the table list "T" are added to the list of tables represented in the from clauses of the "exist" subquery generated at block 64. The table list "T" is reset to empty, and the logic then enters, at state 52, block 74 in FIG. 7.

If the selected category is not one of the three above-disclosed possibilities, then it is a table node, and the logic consequently enters block 68 to add the table node to the table list "T" if the table list "T" is empty. Moving to decision diamond 70, when the table list "T" was not empty prior to block 68 the logic determines whether the table node is a supertable of the table that is at the tail of the table list "T". If it is, indicating that the table node is not necessary to resolve the query, the logic enters FIG. 7 at state 52; otherwise, the logic adds the table node to the tail of the table list "T" at block 72, and then proceeds to FIG. 7.

Figure 7:
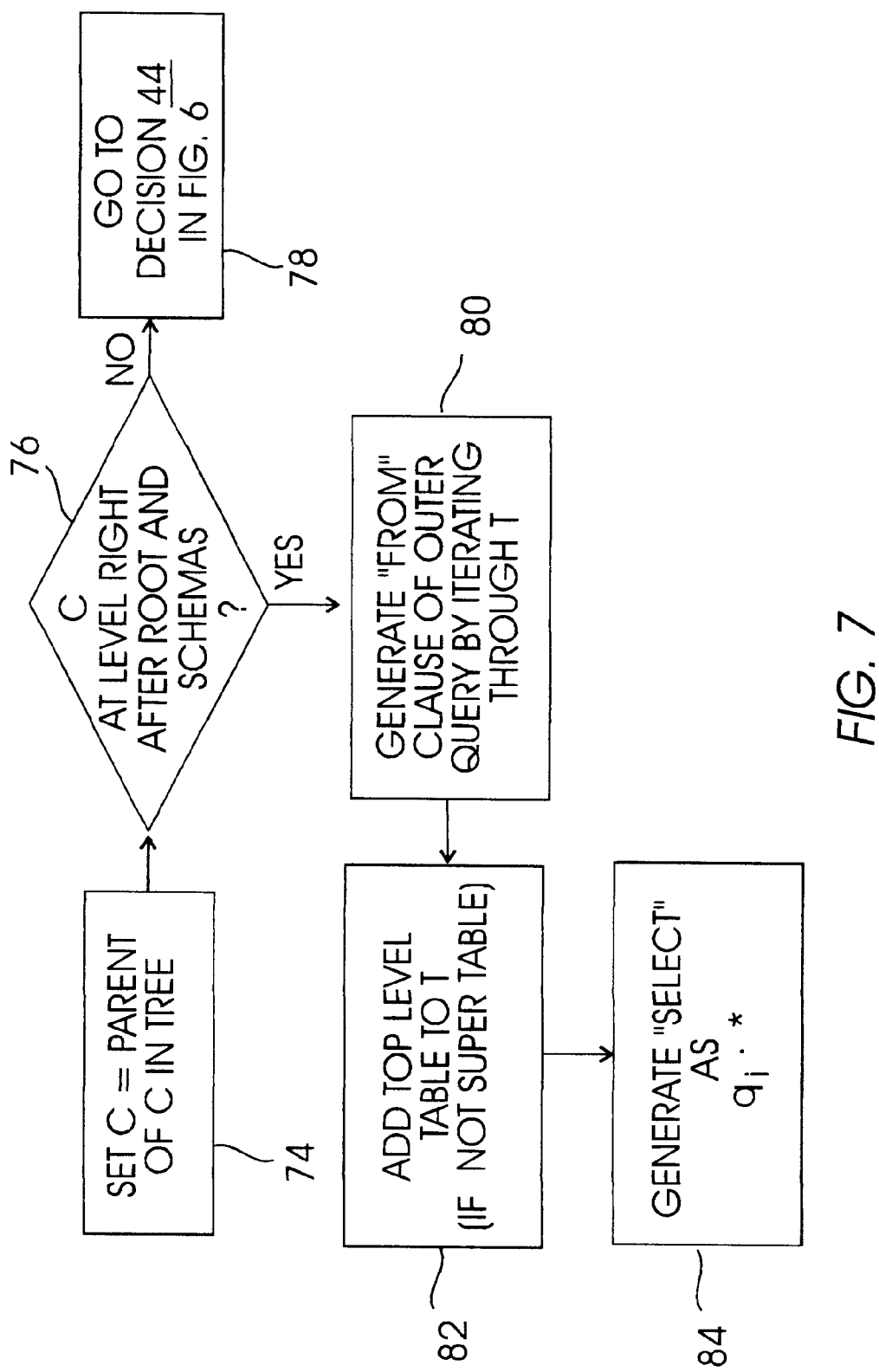
FIG. 7 is a flow chart showing the second portion of the query generation logic.

FIG. 7 shows that after having generated the predicates of FIG. 6 depending on the type of the selected category, the logic sets the selected category "C" to the parent of the category "C" in the hierarchy at block 74. It is then determined at decision diamond 76 whether the new category "C" is located at the hierarchy level just after the root level (and the table schemas mentioned above). If it is not, the logic loops back to decision diamond 44 in FIG. 6, using the new category from block 74 as the selected category "C".

On the other hand, when the category "C" from block 74 is at the highest (non-root) level, the logic proceeds from decision diamond 76 to block 80, to generate a "from" clause of an outer table join by iterating through the table list "T". Moving to block 82, the top level table is added to the table list "T", provided the top level table is not a super table of the table at the tail of the table list "T". Then, a "select" clause is generated at block 84 of the form $q_i \cdot *$, where $q_i$ is a correlation variable on the top level table in the hierarchy.

Figure 8:
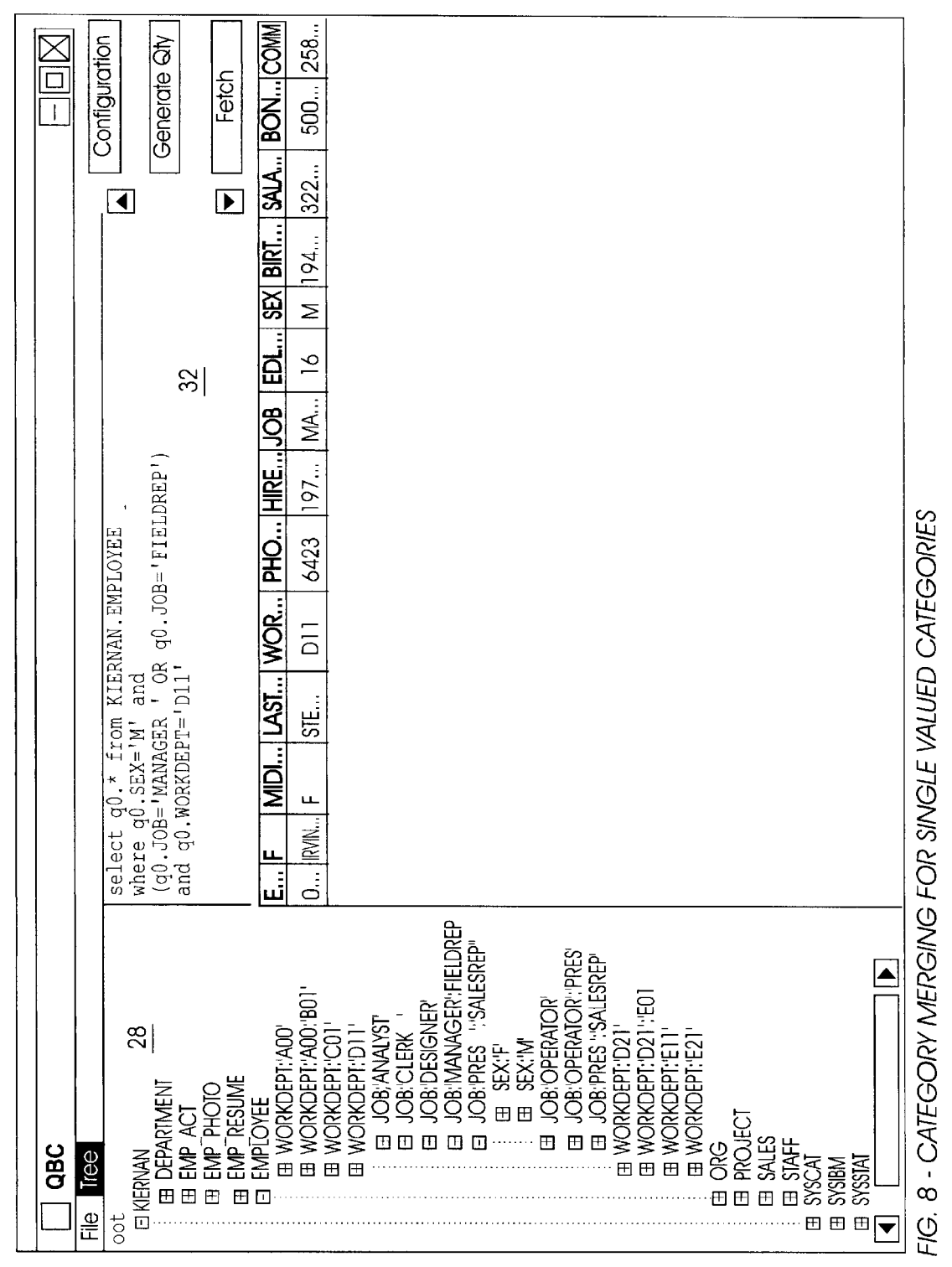

FIGS. 8–15 show additional screen displays illustrating various other operations as well as hierarchy examples discussed in the logic above. As shown in FIG. 8, a user can merge categories for single-valued categories by dragging and dropping one category in the category hierarchy window 28 onto another category. In the example shown, the category "job=field representative" has been dropped onto the category "job=manager" at the same hierarchy level. As a result, the "job-manager" category contains both categories. As the skilled artisan can appreciate looking at the query text window 32 in FIG. 8, the automatically-generated query is altered to reflect the category merging. Any number of categories can be merged together.

FIG. 9 shows an alteration of the categories presented in FIG. 3. As shown, multi-valued categories can be merged by dragging and dropping one category onto another. The new category is formed simply by adjusting the range of the category to encompass the ranges of the two combined categories. Additionally, categories can be updated textually if desired by defining a single value for the category, a range of values, or a sequence of ranges.

FIG. 10 illustrates the categorical choices for relationships that are available from a "Department" table. Color can be used to differentiate between single-valued and multi-valued relationships. While foreign keys for single-valued relationships are found in the tables from which the relationships stem, foreign keys for multi-valued relationships originate from tables referencing the primary keys of the tables. Relationship names are created from foreign key column names. As disclosed in reference to FIG. 7, query results are extracted from the top level table in the hierarchy, i.e., the table from which the category tree is expanded.

Now referring to FIG. 11, query generation is shown for categories that are reachable through the "manager number" relationship in the "Department" table. The query shown in the query text window 32 retrieves a range of departments having a female manager, since "sex=female" has been selected in the category hierarchy window 28. Because "manager number" is a single-valued relationship, the query has a join between the "Department" table and the "Employee" table based on the primary key "employee number" of the table "Employee" and the foreign key "manager number" of the "Department" table. Other predicates in the query shown can be readily appreciated from the information shown in the category hierarchy window 28 and the discussion above of the present logic.

Figure 12:
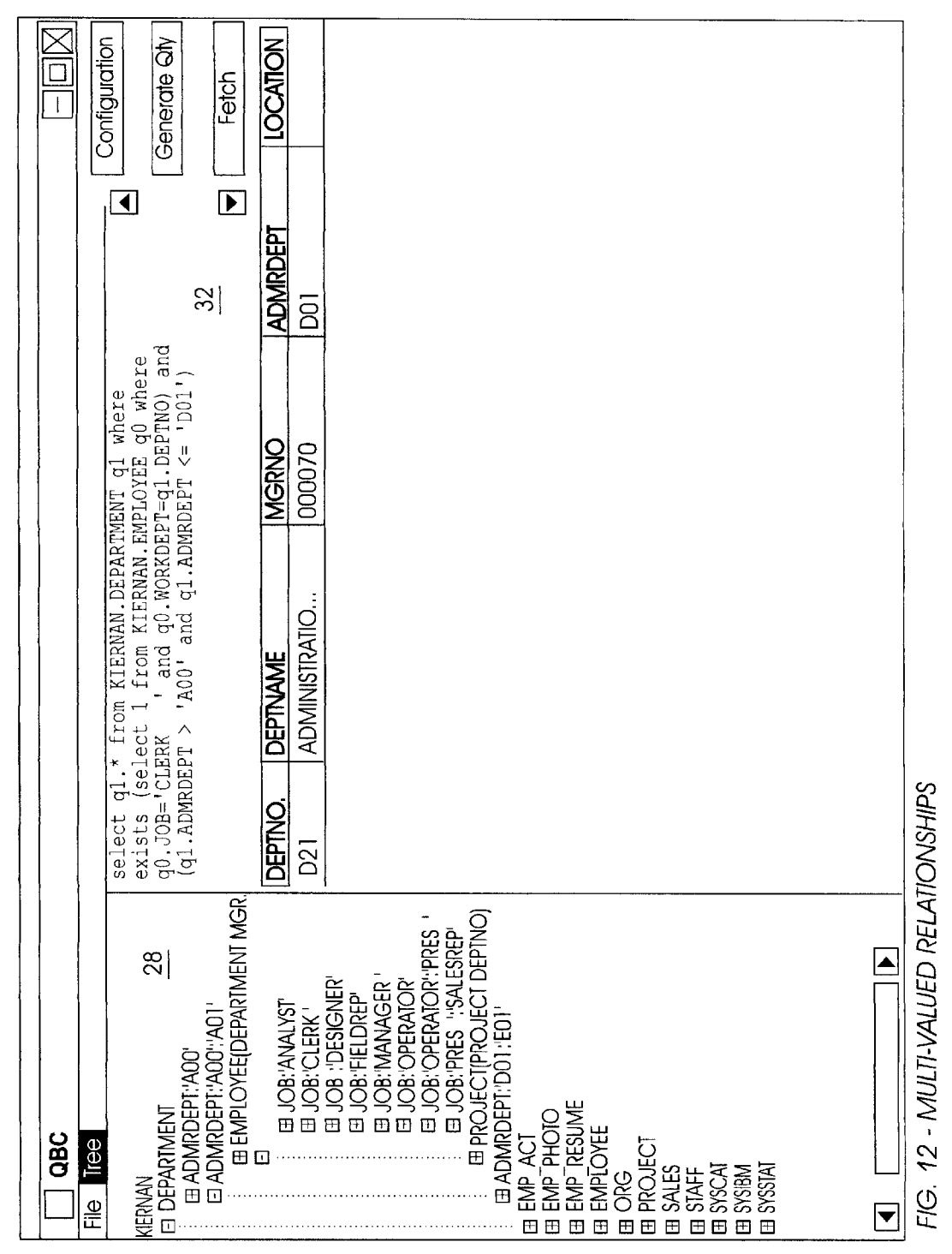

FIG. 12 illustrates query generation for multi-valued relationships. The exemplary query shown selects departments whose employees are clerks. Since "Work department" is multi-valued, the resulting query contains an "exist" predicate as explained in FIG. 6 which is a correlated subquery that qualifies departments having employees who are clerks. The subquery is correlated because the correlation q1 which is defined outside the subquery is used within the subquery. Note that this query might also have been expressed without subqueries as a join query with a "distinct" retrieval option to remove duplicate results.

As discussed in relation to FIG. 6, the selected category can be a table node from a typed table hierarchy, in which subtables can be presented as categorical choices. A type hierarchy can be defined and then a table hierarchy defined by the following exemplary SQL statements.

create type person_t as (name varchar (40), birthyear integer)
create type emp_t under person_t as (salary integer, dept ref(dept_t))
create type dept_t as (name varchar (16), budget int)

create table person of person_t as (ref is oid user generated)
create table dept of type dept_t (ref is oid user generated)
create table emp of emp_t under person (dept with options scope dept)

In the above example, the person table is declared to store objects of type person_t. The "oid" reference column is added as the key column. The emp table is declared to store objects of type emp_t and is also declared to be a subtable of the person table. Accordingly, the person attributes of objects contained in the emp table are visible from the person table. The dept attribute of the emp table is a reference to objects contained or scoped in the dept table.

Figure 13:
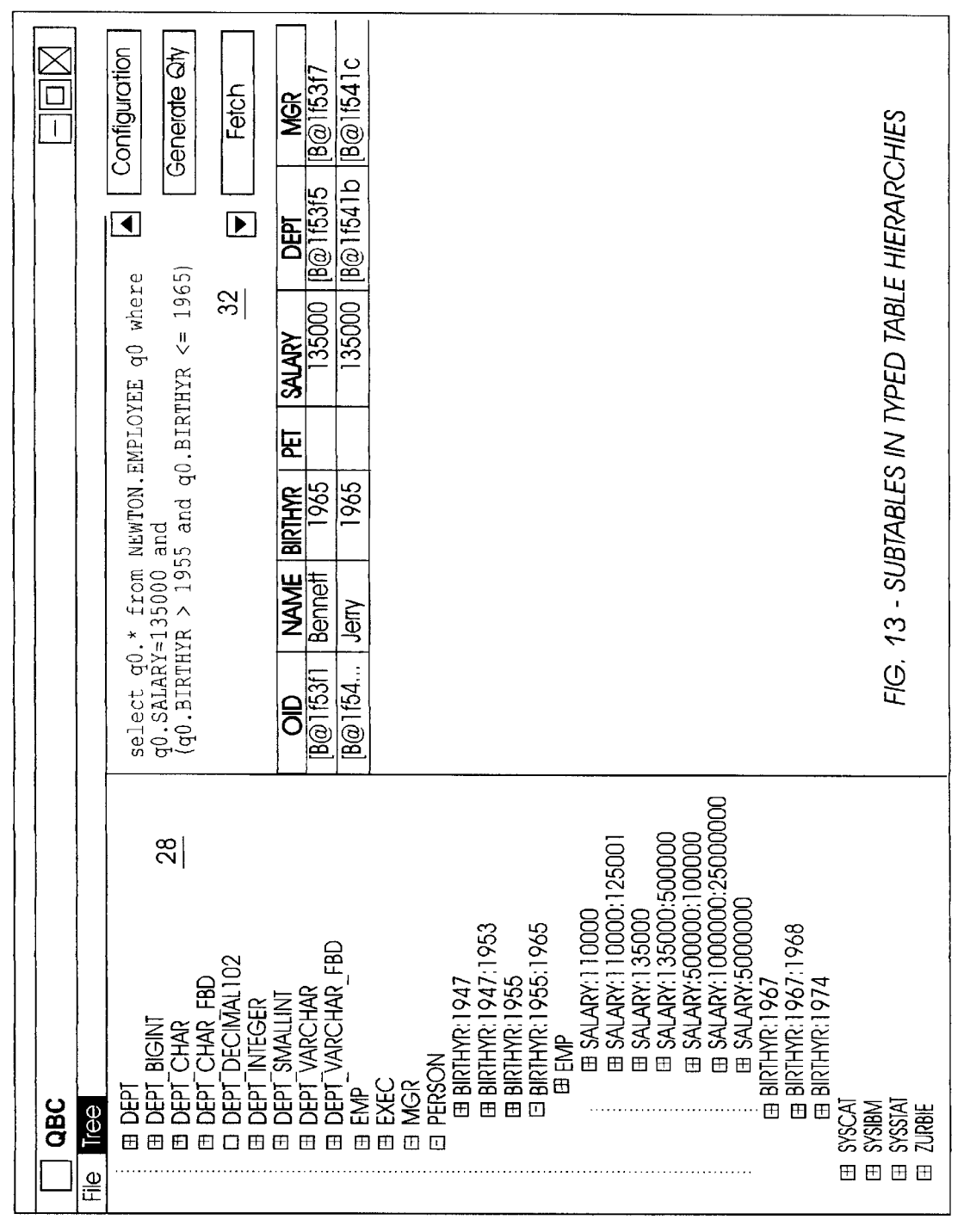

FIG. 13 shows the categorization of the above-discussed person table. Reference-valued attributes related to the person table are set forth further below in reference to FIGS. 14 and 15. As shown in the category hierarchy window 28 of FIG. 13, subtables are presented as potential category choices from which to construct a query. The emp subtable appears as a categorical choice after all attributes of the person table are presented. Since categorization has started with person, emp will only present locally defined attributes so as not to replicate categories that have already been presented. In FIG. 13 it is assumed that the user has selected employees who were born after 1955 but not after 1965, and whose salaries are $135,000. The resulting query shown in the query text window 32 has a single table clause in the from clause since only the emp table is necessary to resolve the query.

Moving to FIG. 14, the use of single-valued relationships to function similar to the foreign keys of FIGS. 10–12 is shown. The category hierarchy window 28 of FIG. 14 shows the selection of salary range belonging to managers who were selected using the "mgr" reference attribute in the emp subtable. The query shown in the query text window 32 selects people who were born after 1955 but not after 1965, and who have managers whose salaries are between $500,000 and $1,000,000. Although the query could have been generated using path expressions, an equivalent join query is generated joining the "oid" attribute of managers with the "mgr" attribute of employees.

FIG. 15 illustrates yet another example, wherein a query is generated based on the selection of multi-valued relationships that are based on reference-valued attributes. These relationships are managed similarly to multi-valued relationships based on foreign keys shown in FIG. 12. In the example shown in the category hierarchy window 28 of FIG. 15, departments have been selected that have employees who were born after 1955 but not after 1965, and whose name is "component broker". The existential subquery of the automatically generated query shown in the query text window 32 of FIG. 15 uses a join between the "dept" reference attribute in the emp table and the "oid" reference attribute in the dept table to establish the relationship between a department and the set of employees in that department.

While the particular SYSTEM AND METHOD FOR QUERY BY CATEGORY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

I claim:

1. A computer system, comprising:
   a general purpose computer, the computer including logic for undertaking method acts to query a database for data, the method acts undertaken by the logic including:
   presenting, to a user, at least one category hierarchy representative of at least a portion of data in a relational database system;
   permitting a user to make a selection of at least one entry in the category hierarchy;
   automatically generating a query using the selection;
   initializing a node "C" based on the selection; and
   associating the node "C" with a type of node, and generating a predicate based on the type of node.

2. The computer of claim 1, wherein the method acts undertaken by the logic further include:
   determining whether the node "C" is a category node, and if so:
      determining whether a value of the node is a range of values, and if so, generating a query predicate based at least partially on an upper bound of the range, and a lower bound of the range, and otherwise generating a query predicate based on a single value.

3. The computer of claim 1, wherein the method acts undertaken by the logic further include:
   determining whether the node "C" represents a single-valued relationship, and if so, generating a query predicate based at least partially on a primary table key and a foreign table key.

4. The computer of claim 3, wherein the method acts undertaken by the logic further include adding a table associated with the primary table key to a list of tables.

5. The computer of claim 1, wherein the method acts undertaken by the logic further include:
   determining whether the node "C" represents a multi-valued relationship, and if so, generating a query predicate based at least partially on a primary table key and a foreign table key.

6. The computer of claim 5, wherein the method acts undertaken by the logic further include:
   generating an exist subquery containing the predicate and all previously generated predicates; and
   adding a table associated with the foreign table key to a list of tables.

7. The computer of claim 1, wherein the method acts undertaken by the logic further include:
   determining whether the node "C" represents a table node, and if so, adding the node to a list "T" of tables at least if the list is empty.

8. The computer of claim 1, wherein the method acts undertaken by the logic further include resetting the node "C" to be the parent node of "C" and then iteratively generating a predicate based on the type of node unless the node "C", after resetting, is at a predetermined level in the hierarchy.

9. The computer of claim 8, wherein the method acts undertaken by the logic further include, when the node "C" is at the predetermined level in the hierarchy, generating a "from" query clause by iterating through a list "T" of tables generated during the act of generating query predicates.

10. The computer of claim 9, wherein the method acts undertaken by the logic further include, after the act of generating a "from" query clause, generating a "select" query clause.

11. The computer of claim 1, wherein the method acts undertaken by the logic further include permitting a user to combine at least two categories in the hierarchy.

12. The computer of claim 1, wherein the method acts undertaken by the logic further include permitting a user to restructure the hierarchy.

13. A computer-implemented method for querying a database, comprising:
  selecting a category from a hierarchy representing a relational database;
  generating a query using the category;
  initializing a node "C" based on the selecting act; and
  associating the node "C" with a type of node, and generating a predicate based on the type of node.

14. The computer-implemented method of claim 13, further comprising:
  determining whether the node "C" is a category node, and if so:
    determining whether a value of the node is a range of values, and if so, generating a query predicate based at least partially on an upper bound of the range, and a lower bound of the range, and otherwise generating a query predicate based at least partially on a single value.

15. The computer-implemented method of claim 13, further comprising:
  determining whether the node "C" represents a single-valued relationship, and if so, generating a query predicate based at least partially on a table having a primary key and a table having a foreign key.

16. The computer-implemented method of claim 15, further comprising adding a table associated with the table having the primary key to a list of tables.

17. The computer-implemented method of claim 13, further comprising:
  determining whether the node "C" represents a multi-valued relationship, and if so, generating a query predicate based at least partially on a table having a primary key and a table having a foreign key.

18. The computer-implemented method of claim 17, further comprising:
  generating an exist subquery containing the predicate and all previously generated predicates; and
  adding a table associated with the foreign table key to a list of tables.

19. The computer-implemented method of claim 13, further comprising:
  determining whether the node "C" represents a table node, and if so, adding the node to a list "T" of tables at least if the list is empty.

20. The computer-implemented method of claim 13, further comprising resetting the node "C" to be the parent node of "C" and then iteratively generating a predicate based on the type of node unless the node "C", after resetting, is at a predetermined level in the hierarchy.

21. The computer-implemented method of claim 20, further comprising, when the node "C" is at the predetermined level in the hierarchy, generating a "from" query clause by iterating through a list "T" of tables generating during the act of generating query predicates.

22. The computer-implemented method of claim 21, further comprising, after the act of generating a "from" query clause, generating a "select" query clause.

23. The computer-implemented method of claim 13, further comprising permitting a user to combine at least two categories in the hierarchy.

24. The computer-implemented method of claim 13, further comprising permitting a user to restructure the hierarchy.

25. A computer program device comprising:
  a computer program storage device readable by a digital processing apparatus; and
  a program on the program storage device and including instructions executable by the digital processing apparatus for performing method acts for generating a query based on a user selection of a database category in a hierarchy, the program comprising:
    computer readable code means for generating at least one SQL query predicate based on a user-selected category of data in a database; and
    computer readable code means for associating a selected category "C" with a type of node, and generating a predicate based on the type of node.

26. The computer program product of claim 25, further comprising:
  computer readable code means for determining whether "C" is a category node, and if so, determining whether a value of the node is a range of values, and if so, generating a query predicate based at least partially on an upper bound of the range, and a lower bound of the range, and otherwise generating a query predicate based on a single value.

27. The computer program product of claim 25, further comprising computer readable code means for adding a table associated with the primary table key to a list of tables.

28. The computer program product of claim 25, further comprising:
  computer readable code means for determining whether "C" represents a multi-valued relationship, and if so, generating a query predicate based at least partially on a primary table key and a foreign table key.

29. The computer program product of claim 25, further comprising:
  computer readable code means for determining whether "C" represents a table node, and if so, adding the node to a list "T" of tables at least if the list is empty.

30. The computer program product of claim 25, further comprising computer readable code means for resetting "C" to be the parent node of "C" and then iteratively generating a predicate based on the type of node unless "C", after resetting, is at a predetermined level in the hierarchy.

31. The computer program product of claim 30, further comprising computer readable code means for, when "C" is at the predetermined level in the hierarchy, generating a "from" query clause by iterating through a list "T" of tables generating during the act of generating query predicates.

32. The computer program product of claim 31, further comprising computer readable code means for, after generating a "from" query clause, generating a "select" query clause.

33. The computer program product of claim 25, further comprising computer readable code means for permitting a user to combine at least two categories in the hierarchy.

34. The computer program product of claim 25, further comprising computer readable code means for permitting a user to restructure the hierarchy.

* * * * *

UNITED STATES PATENT AND TRADEMARK OFFICE
CERTIFICATE OF CORRECTION

PATENT NO.   : 6,598,042 B1
DATED        : July 22, 2003
INVENTOR(S)  : Gerald George Kiernan It is certified that error appears in the above-identified patent and that said Letters Patent is hereby corrected as shown below:

<u>Title page,</u>
Item [75], Inventor's name is corrected to: -- Gerald George Kiernan --

Signed and Sealed this

Seventh Day of October, 2003

JAMES E. ROGAN
*Director of the United States Patent and Trademark Office*